(12) United States Patent
Keppler et al.

(10) Patent No.: US 7,854,076 B2
(45) Date of Patent: Dec. 21, 2010

(54) SPORTS SHOE AND METHOD OF ITS MANUFACTURE

(75) Inventors: Thomas Keppler, Reutlingen/Bronnweiler (DE); Thomas Schaudt, Haigerloch (DE)

(73) Assignee: Uhlsport GmbH (DE)

( * ) Notice: Subject to any disclaimer, the term of this patent is extended or adjusted under 35 U.S.C. 154(b) by 855 days.

(21) Appl. No.: 11/722,080

(22) PCT Filed: Sep. 8, 2006

(86) PCT No.: PCT/EP2006/008764

§ 371 (c)(1),
(2), (4) Date: Jun. 18, 2007

(87) PCT Pub. No.: WO2007/036292

PCT Pub. Date: Apr. 5, 2007

(65) Prior Publication Data

US 2009/0320326 A1   Dec. 31, 2009

(30) Foreign Application Priority Data

Sep. 27, 2005   (DE) .................. 10 2005 046 138

(51) Int. Cl.
*A43B 23/00* (2006.01)
*A43C 15/02* (2006.01)
(52) U.S. Cl. ............................. 36/45; 36/134; 36/67 A; 12/142 P
(58) Field of Classification Search .................. 36/45, 36/134, 59 R, 67 R, 67 A; 12/142 P, 142
See application file for complete search history.

(56) References Cited

U.S. PATENT DOCUMENTS

| 2,260,138 | A | * | 10/1941 | Feinberg | 36/1 |
| 3,499,190 | A | | 3/1970 | Ludwig | |
| 3,525,165 | A | * | 8/1970 | Randall, Jr. | 36/133 |
| 3,559,310 | A | * | 2/1971 | Kiela | 36/7.3 |
| 5,784,809 | A | | 7/1998 | McDonald | 36/117.5 |
| 6,023,859 | A | | 2/2000 | Burke et al. | 36/105 |

(Continued)

FOREIGN PATENT DOCUMENTS

DE   466 730   10/1928

(Continued)

*Primary Examiner*—Ted Kavanaugh
(74) *Attorney, Agent, or Firm*—Hayes Soloway P.C.

(57) ABSTRACT

A sports shoe is proposed which comprises an upper and a sole, the latter having its bottom side provided with a pattern of traction assisting means for penetrating the surface of a lawn or hard court, in which the walking sole is directly bonded to the interior of the upper by injection-molding for reducing the weight and simultaneously maintaining the mechanical strength and flexibility, and only the traction assisting means project towards outside through the upper. For producing the sports shoe, there is proposed a method in which the upper is formed such that it extends across the entire sole surface area, and the upper material is provided in the region of the sole surface area with through holes in the form of a pattern which corresponds to the desired pattern of the traction assisting means, and in which the sole is directly bonded to the upper material by means of the injection-molding method in such a manner that the traction assisting means are also formed in this process and project through the through holes of the upper material towards outside.

26 Claims, 1 Drawing Sheet

U.S. PATENT DOCUMENTS

| | | | |
|---|---|---|---|
| 6,113,123 A | 9/2000 | Cabinas | 280/341 |
| 6,754,984 B2 | 6/2004 | Schaudt et al. | 36/128 |
| 7,290,357 B2 * | 11/2007 | McDonald et al. | 36/102 |
| 7,607,241 B2 * | 10/2009 | McDonald et al. | 36/102 |
| 2005/0198868 A1 * | 9/2005 | Scholz | 36/67 D |
| 2006/0021255 A1 | 2/2006 | Auger et al. | 36/67 |

FOREIGN PATENT DOCUMENTS

| | | |
|---|---|---|
| DE | 1 821 616 | 11/1960 |
| DE | 1 529 870 | 6/1970 |
| DE | 2 216 252 | 10/1973 |
| DE | 196 19 677 | 1/1999 |
| DE | 697 10 156 | 8/2002 |
| DE | 101 26 557 | 12/2002 |
| DE | 202 08 713 | 2/2003 |
| DE | 101 42 753 | 4/2003 |
| DE | 10 2004 011 680 | 9/2005 |
| GB | 1134970 | 8/1967 |
| NL | 6710854 | 2/1968 |
| WO | WO 97/46127 | 12/1997 |
| WO | WO 2005/120273 | 12/2005 |
| WO | WO 2006/014776 | 2/2006 |
| WO | WO 2006/014776 | 9/2006 |

* cited by examiner

SPORTS SHOE AND METHOD OF ITS MANUFACTURE

The invention relates to a sports shoe, in particular a soccer shoe or sprint shoe, comprising an upper and a sole, the latter having its bottom side provided with a pattern of traction assisting means for penetrating the surface of a lawn or hard court.

The invention further relates to a method of producing such a shoe, in which an upper is formed from at least one blank of an upper material and is connected with a sole having traction assisting means which project at the underside beyond the plane of the sole and are arranged in a pattern.

In the context of soccer shoes, "traction assisting means" primarily are understood to be studs and spikes as well as traction elements with complex shape, as they are described in DE-A-101 26 557, for instance. Usually, spikes are used as traction assisting means for sprint shoes. All these traction assisting means can either be produced of plastic in one piece with the sole of the sports shoe, for example by injection-molding, or they can be produced as separate parts of plastic or metal and connected with the sole in detachable or non-detachable fashion. The most common type of traction assisting means which can be detachably connected with the sole are screw-in studs bearing a threaded bolt which can be screwed in threaded bushings which are an integral component of the sole.

With traditional sports shoes, the upper of the shoe is placed on the walking sole (which in the following will be referred to as "sole", compared to the insole provided in the interior of the upper) and firmly connected with the top side of the sole by sewing or gluing, injection-molding or vulcanizing. As the sole represents a closed surface, it is not required in conventional shoe production that the upper material is closed at the sole side, nor is it necessary that it entirely covers the top side of the sole. Rather, it is sufficient if the upper material on the top side of the sole is folded so as to provide a small strip and is fastened onto the sole.

In order to give the shoe construction the required strength with simultaneous maintenance of pliability and flexibility, necessary for walking or sprinting, the soles of a sports shoe, which predominantly are made of plastic and provided with traction assisting means, have to be realized so as to be relatively massive and heavy, and also the connection between the upper material and the sole normally has to be reinforced by expensive means, so as to be able to withstand the high mechanical demands throughout the greatest possibility of time during execution of the sports in question.

The international patent application with the publication number WO 2006/014776 A1, which is post-published but has an earlier application date, describes a sports shoe comprising an upper and a sole provided with traction assisting means, in which the sole is arranged in the interior of the upper such that only the traction assisting means, being formed preferably in one piece with the sole, project towards outside through corresponding holes in the upper material, with the upper material entirely covering the underside of the sole except for the traction assisting means. Here, the upper material consists of leather, artificial leather, in particular polyurethane, textile materials or combinations thereof. The upper is sewed together from at least two pieces or connected in another way such that a seam forms around the entire outer contour of the sole. This seam is of disadvantage, because it is exposed to the highest mechanical stresses whilst wearing the shoe and the inevitable perforation of the materials in the region of the seam may result in the ingress (infiltration) of water or moisture into the interior of the shoe.

During production of the shoe according to WO 2006/014776 A1, one proceeds from a finished sole and a finished upper which is sewn together from two pieces; sole and upper will be unified on a last, with the upper which initially is turned inside out is folded back over the sole which is fastened to the last and provided with an adhesive layer. This method is linked with too many individual error-prone working steps and is not very well suited for high-volume mass production.

The invention is based on the object to provide a sports shoe of the type initially mentioned, which in comparison with the shoe constructions known hitherto is more flexible and elastic as a whole, but can be produced in a simpler way and at a more reasonable price, without losing its mechanical stability, in particular with respect to a preferably waterproof connection between upper and sole.

It is further an object of the invention to make available a simple and cost-efficient method of producing a sports shoe of this type, which can be carried out on industrial scale and is capable of being automated.

This problem is solved according to the invention by a sports shoe comprising an upper and a sole, the bottom side of the latter being provided with a pattern of traction assisting means for penetrating the surface of a lawn or hard court, the sole being made of thermoplastic and/or elastomeric plastic and arranged in the interior of the upper, the latter being made of leather, artificial leather, a textile compound or composite material and having through holes in the form of a pattern corresponding to the pattern of the traction assisting means, only the traction assisting means projecting through the through holes of the upper material towards outside, and the upper entirely covering the underside of the sole except for the traction assisting means, with the sole being directly bonded to the upper by injection-molding and the upper is connected with the underside of the sole across the entire surface area.

The sole of the shoe according to the invention can not be seen from outside, except for the traction assisting means which project through the upper. Thus, a person who wears the sports shoe according to the invention touches the ground with the tips of the traction assisting means only, usually the lawn of a sports field or the path of an athletic sports field. It is only with very soft or wet ground that the sports shoe according to the invention sinks in under the weight of the wearer to such an extent that the outer surface of the upper material, covering the underside of the inner sole, directly makes contact with the soil of the sports field.

By shifting the sole to inside the upper it is much easier to produce a firm connection between upper and sole across the full surface area, so that it is possible to make the sole lighter, thinner, softer and more flexible without impairing the mechanical strength of the overall construction. Compared to a conventional shoe construction, it is possible by means of the invention to achieve the same mechanical strength with a lower sole thickness, and with it a lower total weight of the shoe. Moreover, it is possible to achieve a full surface area connection—which is much firmer and less error-prone—between the upper material and the sole surface than is the case with conventional sports shoes with an externally affixed sole.

The material of which the upper consists has through holes in the form of a pattern which corresponds to the desired pattern of the traction assisting means. The upper material may be made of leather, artificial leather, a textile compound or composite material, even with layers which are foamed at least in part; particularly preferred materials are thermoplastic polyurethane (TPU), polyethylene (PE) and ethylene vinyl acetate polymer (EVA), which are very suited for being bonded by injection-molding with soles of the same or chemically and physically affine material.

The traction assisting means project through the through holes of the upper materials to outside, and the upper completely covers and encloses the underside of the sole except for the traction assisting means.

According to the invention, all sorts of spikes, studs, grip elements, but also fastening cams for spikes, studs or grip elements are considered as traction assisting means. The fastening cams may comprise a thread for screwing on the named traction elements; they can be provided with latching elements by means of which the elements can be snapped on into place, or they are threadless shaped bodies, for instance cylindrical or polygonal cams engaging in complementarily shaped recesses of the elements to be attached and either are permanently glued to the elements, welded to them by heating or detachably or non-detachably clamped via ramped or conically formed surfaces.

The sole of the sports shoe according to the invention consists of thermoplastic and/or elastomeric plastic. It is of particular desirability that the sole has areas of differing hardness and/or differing elasticity. Preferred examples of the plastics which have been mentioned are thermoplastic polyurethane (TPU), polyolefin, preferably with elastomeric portions, silicones and mixtures of the named plastics.

The sole of the sports shoe according to the invention is injection-molded, i.e. produced by injection-molding or assembly injection-molding from the thermo-plastic and/or elastomeric plastics which have been mentioned, with the sole being directly bonded to the upper material by injection-molding.

For stiffening and/or enhancing the elasticity, the sole may have at least one armoring element, for instance in the form of a sheet structure of fibers (glass, plastic or metal fibers), metal (band, sheet metal or wire) and/or of plastic (band, plate or board).

It is of particular desirability that the sole additionally contains at least one damping element for absorbing shocks and, hence, for taking care of the bones, ligaments and joints of the sportsperson who wears the shoe. Such damping elements preferably consist of elastomer materials, for instance on the basis of silicones, which can be inserted as shaped bodies (e.g. in the form of small rods) in recesses of the sole which are provided for this purpose, or become integral components of the sole in the course of producing the sole from different materials (multi-component injection-molding).

As with conventional sports shoes, the top side of the sole additionally may be covered in the interior of the upper with an insole, both enhancing the aesthetics of the shoe and improving the wearing comfort. The insole may be laid in unfixed, but preferably is glued to the top side of the sole or fastened in another way, e.g. sewn on.

The object which was initially mentioned is further solved by a method of producing a sports shoe, in which an upper is formed from at least one pre-cut part of an upper material of leather, artificial leather, a textile compound or composite material and is connected with a sole of thermoplastic and/or elastomeric plastic, the sole having traction assisting means projecting at the underside out of the plane of the sole and arranged in a pattern, the upper being formed such that it extends across the entire sole surface area, and the upper material being provided in the region of the sole surface area with through holes in the form of a pattern which corresponds to the desired pattern of the traction assisting means, with the sole being directly bonded to the resulting inner side of the upper material in an injection-molding method in such a manner that the traction assisting means are also formed in this process and project through the through holes of the upper material towards outside, the upper material being connected with the underside of the sole across the entire surface area.

As the upper has to enclose a human foot including sole, toes, heel, ankle and lower section of the leg, it will be understood by those skilled in the art that the outer edges of the blank of the upper material—when the sole has been bonded to the inner side of the upper material by injection-molding—are directly connected with each other to form an upper approximately in the shape of a stocking, which has an access hole but is closed for the rest and extends externally across the entire sole surface area—unlike conventional shoe constructions, in which the upper material is firmly connected with the sole only in the region of a narrow strip around the outer contour of the sole. Depending on the selected material, the connection of the cut edges of the upper material can be effected by means of sewing, gluing or welding.

The method according to the invention can be carried out in a cost-efficient manner and is capable of being automated, in particular on an industrial scale, and it allows, compared to conventional methods, the use of a thinner, more flexible and lighter sole without any impairment to the strength of the overall construction. Due to the direct bonding by means of injection-molding, the upper material is connected with the underside of the sole across the full surface area. The method makes it possible to obtain a homogenous, permanently fixed and waterproof connection between upper and sole which at the same time is flexible and elastic.

A sole is used which is made of thermoplastic and/or elastomeric plastic; "elastomeric plastic" should also be understood as synthesized rubber and elastomer materials on the basis of butadiene or isoprene, silicones, polyurethane elastomer materials and thermoplastic plastics with elastomeric portions.

Leather, artificial leather, textile compounds or composite materials, in particular with layers which are foamed at least in part, are used as upper material; those upper materials are preferred which contain thermoplastic and/or elastomeric plastic at least in portions, because this facilitates the direct injection-molding without using primers or adhesion-promoting intermediate layers.

The injection-molding method is preferably carried out with a two-part injection mould; here, either the upper is introduced on a last into the mould, or a single sheet-like or web-shaped upper material blank is placed in the injection mould, to which the sole is directly bonded by injection-molding. This second variant of the method is particularly economic and therefore is particularly preferred.

It is preferred that a mould cover is used as one of the two parts of the injection mould, which mould cover has cavities for forming the traction assisting means, so that during injection-molding the sole is formed in one piece with the traction assisting means and simultaneously is connected with the upper. In case several different materials are used in this process (multi-component injection-molding), these may also be differently colored or have different physical properties (e.g. damping, elasticity), whereby the traction assisting means and the sole can be produced so as to have different colors or different physical properties—but nevertheless in one piece. The only point is that different mould covers are needed for different patterns of the traction assisting means, while the second part of the mould may always be the same.

As an alternative it is possible to employ the assembly injection-molding, in which a mould cover is used as one of the two parts of the injection mould, in which separately produced traction assisting means are placed, so that they become integral components during the injection-molding of the sole and the sole simultaneously is connected with the upper. Even in this case it would be possible to use one single basic mould for different patterns of traction assisting means when different mould covers are employed, which reduces the mould costs and allows an economic industrial mass production.

It is preferable that the upper, at least in the region of the sole, is formed in one piece without any seam and joint, and fully encloses the sole even at its edges. In case there are seams in the upper material, these are sealed in the interior of the upper and prior to injection-molding with a sealing band, so that the injection-molding mass which usually is injected at a temperature between 180 and 220° C., will not be forced through the seams.

For reinforcing the sole, it is possible to insert in the injection mould a fabric or knitted fabric adapted to the contours of the sole and made of glass, metal or plastic fibers, or another suitable armoring element of metal or plastic, which in the course of injection-molding will become an integral component of the sole and both enhances the mechanical strength and the elasticity of the sole.

As already mentioned, the finished sole may be covered in the interior of the upper with an insole, in order to improve the aesthetics and the wearing comfort of the sports shoe according to the invention.

Finally it is possible for reinforcing the toe and/or heel regions of the shoe to apply a protective cap from outside to the corresponding zones of the upper, in fact by gluing or injection-molding.

The invention will be explained in the following with the aid of the drawing.

Figure 1:
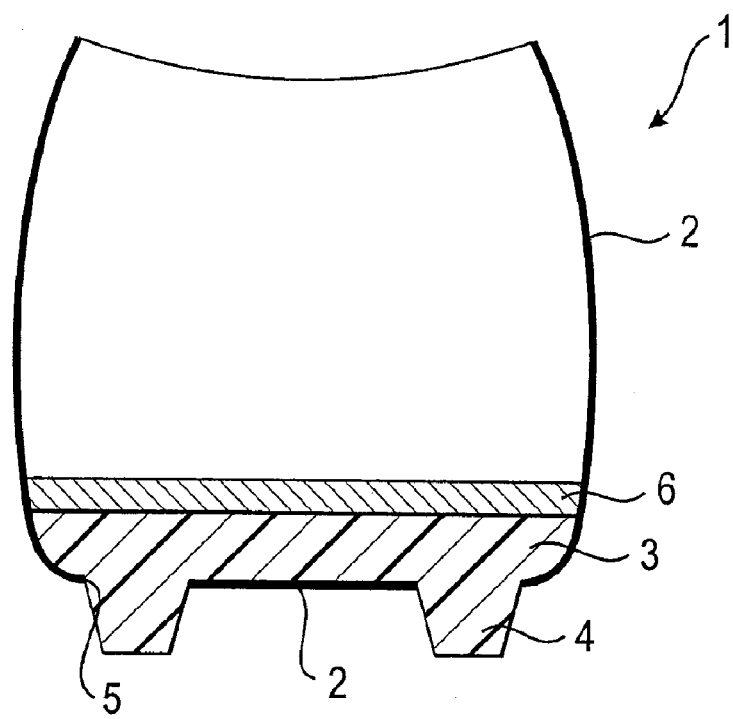
FIG. 1 is a section (schematic) through an embodiment of a soccer shoe according to the invention with a sole injection-molded in one piece.

In the embodiment which is shown (FIG. 1), the sports shoe 1 consists of an upper 2 and a sole 3 arranged in the interior of the upper 2, the bottom side of which sole is provided with a pattern of traction assisting means for penetrating the surface of a lawn or hard court, the traction assisting means being realized as studs 4 and projecting through the upper 2 towards outside. The upper material has through holes 5 in the form of a pattern which corresponds to the pattern in which the studs 4 are arranged. With the exception of the studs 4, the underside of the sole 3 is completely covered by the upper 2, the latter enclosing the sole 3 also at the rounded outer edges of the sole 3.

The sole 3 and the studs 4 are made of thermoplastic polyurethane in one piece by an injection-molding method, and are directly bonded in one and the same injection-molding process to the upper material and therefore are firmly connected with each other across the full surface area, whose upper material likewise is a textile compound coated with thermoplastic polyurethane.

In the interior of the upper 2, the top side of the sole 3 is covered with an insole 6 and glued therewith.

Figure 2:
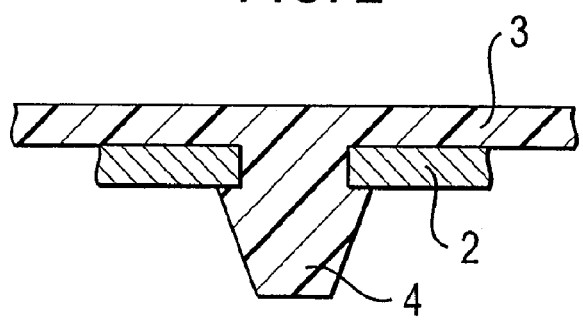
FIG. 2 is an enlarged detail of FIG. 1 and shows the connection between the upper and sole with a traction element injection-molded in one piece with the sole.

As is apparent from the enlarged detail (FIG. 2), the stud 4 injection-molded in one piece with the sole 3 is designed so as to have a hat-shaped cross-section, i.e. with a shoulder, whereby the through holes 8 in the upper material 2 are completely covered and sealed, so that no moisture can penetrate from the underside of the shoe through the through holes 8 to the inside sole 3.

Figure 3:
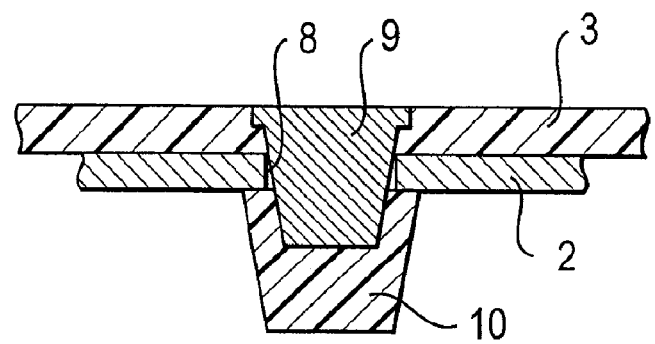
FIG. 3 shows in an enlarged, schematic section the connection between the upper and the sole in another embodiment with a fastening cam provided for a stud and embedded in the sole by means of injection-molding.

If the sole 3 is produced in the assembly injection-molding method in a two-part injection mould, wherein a mould cover is used in which the separately produced fastening cams 9 are placed, so that they become integral components of the sole 3 during injection-molding, only the fastening cams 9 will project through the through holes 8 in the upper 2 (FIG. 3). In this embodiment, a stud 10 will be firmly connected with the fastening cam 9 from outside, with the possibility of a detachable or non-detachable connection, for instance by gluing, latching, clamping or screwing. With this embodiment, too, the outer diameter of the stud 10 is larger than the diameter of the through hole 8, in order to achieve a surface pressure between an end face of the stud 10 and the surface of the upper 2, and in the course of this a reliable sealing of the through hole 8.

The invention claimed is:

1. A sports shoe comprising an upper and a sole, the bottom side of the latter being provided with a pattern of traction elements for penetrating the surface of a lawn or hard court, the sole being made of thermoplastic and/or elastomeric plastic and arranged in the interior of the upper, the latter being made of leather, artificial leather, a textile compound or composite material and having through holes in the form of a pattern corresponding to the pattern of the traction elements, only the traction elements projecting through the through holes of the upper material towards outside, and the upper entirely covering the underside of the sole except for the traction elements, wherein the sole is directly bonded to the upper by injection-molding and the upper is connected with the underside of the sole across the full surface area.

2. The sports shoe according to claim 1, wherein the traction elements are selected from the group consisting of spikes, studs, grip elements or fastening cams for spikes, studs and grip elements.

3. The sports shoe according to claim 1, wherein the sole has areas with differing hardness and/or elasticity.

4. The sports shoe according to claim 1, wherein the sole is made of a polymeric material selected from the group consisting of polyurethane, polyolefin, elastomeric polyolefin, silicone and mixtures thereof.

5. The sports shoe according to claim 1, wherein the sole is injection-molded in one piece with the traction elements.

6. The sports shoe according to claim 1, wherein sleeves are embedded in the sole in the pattern which is provided for the traction elements, the sleeves serving for detachably or non-detachably fastening the traction elements.

7. The sports shoe according to claim 6, wherein the sleeves are designed as threaded sleeves or latching sleeves.

8. The sports shoe according to claim 1, wherein the sole has at least one armoring element for stiffening and/or for increasing the elasticity.

9. The sports shoe according to claim 8, wherein the armoring element contains a sheet structure of fibers, metal and/or plastic.

10. The sports shoe according to claim 1, wherein the sole contains at least one damping element.

11. The sports shoe according to claim 1, wherein the upper is made of a thermoplastic composite material which is based on polyurethane, polyethylene and/or ethylene vinyl acetate and in particular foamed at least in part.

12. The sports shoe according to claim 1, wherein, at least in the region of the sole, the upper is designed in one piece and without any seam and joint and completely encloses the sole even at its edges.

13. The sports shoe according to claim 1, wherein the top side of the sole is covered with an insole in the interior of the upper.

14. The sports shoe according to claim 13, wherein the insole is glued to the top side of the sole.

15. A method of producing a sports shoe comprising forming an upper from at least one pre-cut part of an upper material of leather, artificial leather, a textile compound or composite material, and connecting said upper with a sole of thermoplastic and/or elastomeric plastic, the sole having traction elements projecting at the underside out of the plane of the sole and arranged in a pattern, the upper being formed such that it extends across the entire sole surface area, and the upper material being provided in the region of the sole surface area with through holes in the form of a pattern which corresponds to the desired pattern of the traction elements, wherein the sole is directly bonded to the resulting inner side of the upper material in an injection-molding method in such a manner that the traction elements are also formed in this process and project through the through holes of the upper material towards outside and the upper material is connected with the underside of the sole across the full surface area.

16. The method according to claim 15, wherein an upper material is used which contains at least portions of thermoplastic and/or elastomeric plastic.

17. The method according to claim 15, wherein the injection-molding method is carried out with a two-part injection mould, the upper being introduced into the mould on a last.

18. The method according to claim 15, wherein the injection-molding method is carried out with a two-part injection mould, in which one single sheet-like or web-shaped blank of the upper material is placed, to which the sole will be directly bonded by injection-molding.

19. The method according to claim 17, wherein a mould cover is used as one of the two parts of the injection mould, which mould cover has cavities for forming the traction elements, so that during injection-molding the sole is formed in one piece with the traction elements and simultaneously is connected with the upper.

20. The method according to claim 18, wherein a mould cover is used as one of the two parts of the injection mould, which mould cover has cavities for forming the traction elements, so that during injection-molding the sole is formed in one piece with the traction elements and simultaneously is connected with the upper.

21. The method according to claim 17, wherein a mould cover is used as one of the two parts of the injection mould, with separately produced traction elements being placed in the mould cover, so that they become integral components of the sole during injection-molding the sole and the sole is simultaneously connected with the upper.

22. The method according to claim 18, wherein a mould cover is used as one of the two parts of the injection mould, with separately produced traction elements being placed in the mould cover, so that they become integral components of the sole during injection-molding the sole and the sole is simultaneously connected with the upper.

23. The method according to claim 19, wherein a mould cover is used as one of the two parts of the injection mould, with separately produced traction elements being placed in the mould cover, so that they become integral components of the sole during injection-molding the sole and the sole is simultaneously connected with the upper.

24. The method according to claim 15, wherein for reinforcing the sole a fabric or knitted fabric adapted to the contours of the sole and made of glass, metal or plastic fibers is placed in the injection mould, said fabric or knitted fabric becoming an integral component of the sole during injection-molding.

25. The method according to claim 15, wherein the finished sole is covered with an insole in the interior of the upper.

26. The method according to claim 15, wherein, for reinforcing the toe and/or heel regions of the shoe, protective caps are applied from outside to the corresponding upper regions by gluing or injection-molding.

\* \* \* \* \*